United States Patent [19]

Andrieu et al.

[11] Patent Number: 5,036,326
[45] Date of Patent: Jul. 30, 1991

[54] METHOD AND DEVICE FOR THE DISPLAY OF SEVERAL RADAR IMAGES IN A SINGLE MOSAIC

[75] Inventors: Jean-Pierre Andrieu, Paris; Dominique Gault, Ville D'Avray; Jean-Claude Henri, Boulogne Billancourt, all of France

[73] Assignee: Thomson-CSF, Puteaux, France

[21] Appl. No.: 442,358

[22] PCT Filed: May 6, 1988

[86] PCT No.: PCT/FR88/00225
§ 371 Date: Nov. 6, 1989
§ 102(e) Date: Nov. 6, 1989

[87] PCT Pub. No.: WO88/08988
PCT Pub. Date: Nov. 17, 1988

[30] Foreign Application Priority Data

May 7, 1987 [FR] France ................. 87 06486

[51] Int. Cl.⁵ ............................................. G01S 7/56
[52] U.S. Cl. .................................. 342/176; 342/179
[58] Field of Search ............... 342/176, 59, 179, 185, 342/177

[56] References Cited

U.S. PATENT DOCUMENTS

| | | | |
|---|---|---|---|
| 3,160,881 | 12/1964 | Pederzani et al. | 342/176 |
| 3,378,835 | 4/1968 | Mooney, Jr. et al. | 342/59 |
| 3,872,474 | 3/1975 | Levine | 342/36 |
| 4,224,669 | 9/1980 | Brame | 342/433 |
| 4,434,422 | 2/1984 | Kenol et al. | 342/185 |
| 4,580,164 | 4/1986 | Andrieu et al. | 342/185 X |
| 4,601,001 | 7/1986 | Guiglini | 364/518 |
| 4,612,544 | 9/1986 | DaSilva et al. | 364/900 |
| 4,660,043 | 4/1987 | Lachaize et al. | 342/185 |
| 4,688,046 | 8/1987 | Schwab | 342/456 |
| 4,729,029 | 3/1988 | Henri et al. | 340/731 |
| 4,754,279 | 6/1988 | Cribbs | 342/185 |
| 4,757,317 | 7/1988 | Henri et al. | 342/185 |
| 4,774,516 | 9/1988 | Henri et al. | 342/185 |
| 4,777,489 | 10/1989 | Allan | 342/176 |

Primary Examiner—John B. Sotomayor
Attorney, Agent, or Firm—Pollock, VandeSande & Priddy

[57] ABSTRACT

The object of the invention is a device to display several radar images in a single resultant image, formed by a mosaic image of different radar images. To this effect, the invention provides for the use of means for mutual exclusion of the radar images so that a given point of the resultant image corresponds to the display on one and only one radar.

9 Claims, 7 Drawing Sheets

METHOD AND DEVICE FOR THE DISPLAY OF SEVERAL RADAR IMAGES IN A SINGLE MOSAIC

BACKGROUND OF THE INVENTION

The present invention concerns the display of radar images and, more particularly, a case where one and the same geographical zone is covered by several radars and where it is desired to obtain a single resultant image, formed by a mosaic of the images given by the different radars.

The need to make a mosaic arises notably when the position of a radar is such that it cannot cover the entire zone it is entrusted with monitoring, owing to obstacles such as mountains or tall buildings creating a shadow in the zone under surveillance, namely a sector without echo. This, for example, is often the case with airport surveillance radars.

To cover the entire zone, one or more additional radars are then needed, and are arranged so as to reach the shaded sectors of the first radar.

To enable an operator to have a comprehensive image of the zone on a single screen, it is then necessary to make a mosaic of images given by the different radars.

There are known ways to make this mosaic by taking, for each of the pixels of the resultant image, a video signal equal to a function (mean, maximum etc.) of each of the pixels given by the different radars. Since, in general, the images given by the different radars overlap one another, two types of zones are then distinguished on the single screen:
those reached by a single radar;
those reached by several (at least two) radars.

In the second type of zone, the echos of the detected objects (aircraft for example) processed by each of the radars should, of course, be superimposed on the screen and, to a given aircraft, there should therefore. This requiremement may not necessarily be achieved due to the asynchronism of the rotation of the radars. There may be movement by the aircraft between the instant when it is detected by the first radar and the instant when it is detected by the second one.

Furthermore, the radar video signal always contains a certain degree of noise and, with this type of system, the noises get added together in the zones common to several radars.

SUMMARY OF THE INVENTION

The present invention is aimed at forming a mosaic from a plurality of radar images, which avoids the previous drawbacks through the use of means for the mutual exclusion of the radar images. To a given point of the resultant image, there thus corresponds the display of one and only one radar.

Other objects, particular features and results of the invention will emerge from the following description, illustrated by the appended figures.

DESCRIPTION OF THE PREFERRED EMBODIMENT

In these different figures, the same references pertain to the same elements.

Figure 1:
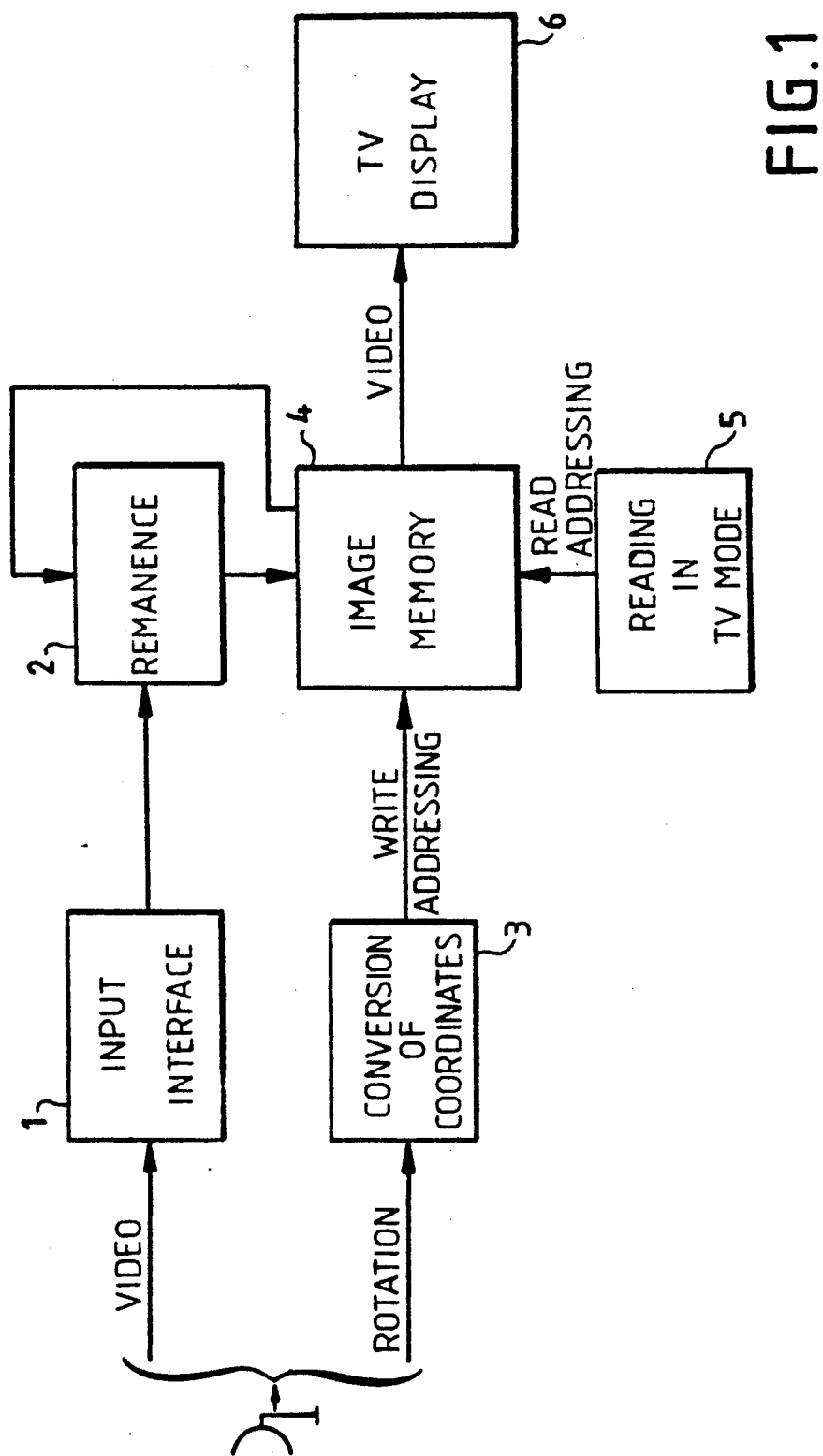
FIG. 1, the block diagram of a standard digital converter of images.

FIG. 1 represents a standard digital converter of images.

It will be recalled that a converter of this type, also called an IDC, has the essential role of converting a radar image, given in polar coordinates and having relatively slow refreshing, into a television type light image, enabling it to be exploited in an illuminated environment.

The IDC thus receives, firstly, video signals from the radar receiver and, secondly, the radar antenna rotation signals.

The video signals are formed, firstly, by a synchronization signal indicating that a pulse has been emitted by the radar and, secondly, by the video proper, consisting of all the responses to (echos from) this pulse. These video signals are received by an input interface 1 comprising chiefly circuits for sampling the input analog information and a memory enabling the memorizing of the video information corresponding to each radar pulse.

The rotation signals are formed, firstly, by a North signal which is a beep given by each passage of the antenna through the North and, secondly, by an angle increment signal indicating that the beam has rotated by 1/nth of a turn with respect to the preceding increment if n increments correspond to 360 degrees. These rotation signals are received by a set 3 of coordinates conversion circuits.

The IDC also has a memory 4, called an image memory containing, in digital form, the image which will be displayed in television mode on the screen of a display device 6. The capacity of the memory 4 is adapted to the television standard used, i.e. it comprises as many memory compartments as the image displayed on the screen has pixels. Furthermore, the luminance of each pixel is encoded by means of a certain number of bits. The stages for reading the content of the memory 4, designed for the screen 6, and for writing the radar information, given by the interface 1 (through the block 2),in this memory are asynchronous. The reading takes priority and, during a reading stage, the writing is stopped.

The coordinates conversion set 3 thus provides for the addressing, in writing mode, of the image memory 4 and the interface 1, through the block 2, provides the video information to be memorized in synchronism with the addressing.

A set 5 of television mode reading circuits provides for the addressing in reading mode of the image memory 4.

The IDC also has a set 2 of artificial remanence circuits which have the role of creating, for the digital information contained in the memory 4, for which there are no modifications due to ageing, a remanence effect comparable to the one produced in a remanent tube where the brilliance of a dot starts decreasing as soon as it is recorded.

The IDC also has a control processor (not shown) receiving both the video signals and the rotation signals and providing for the control and synchronization of all the preceding circuits.

Figure 2:
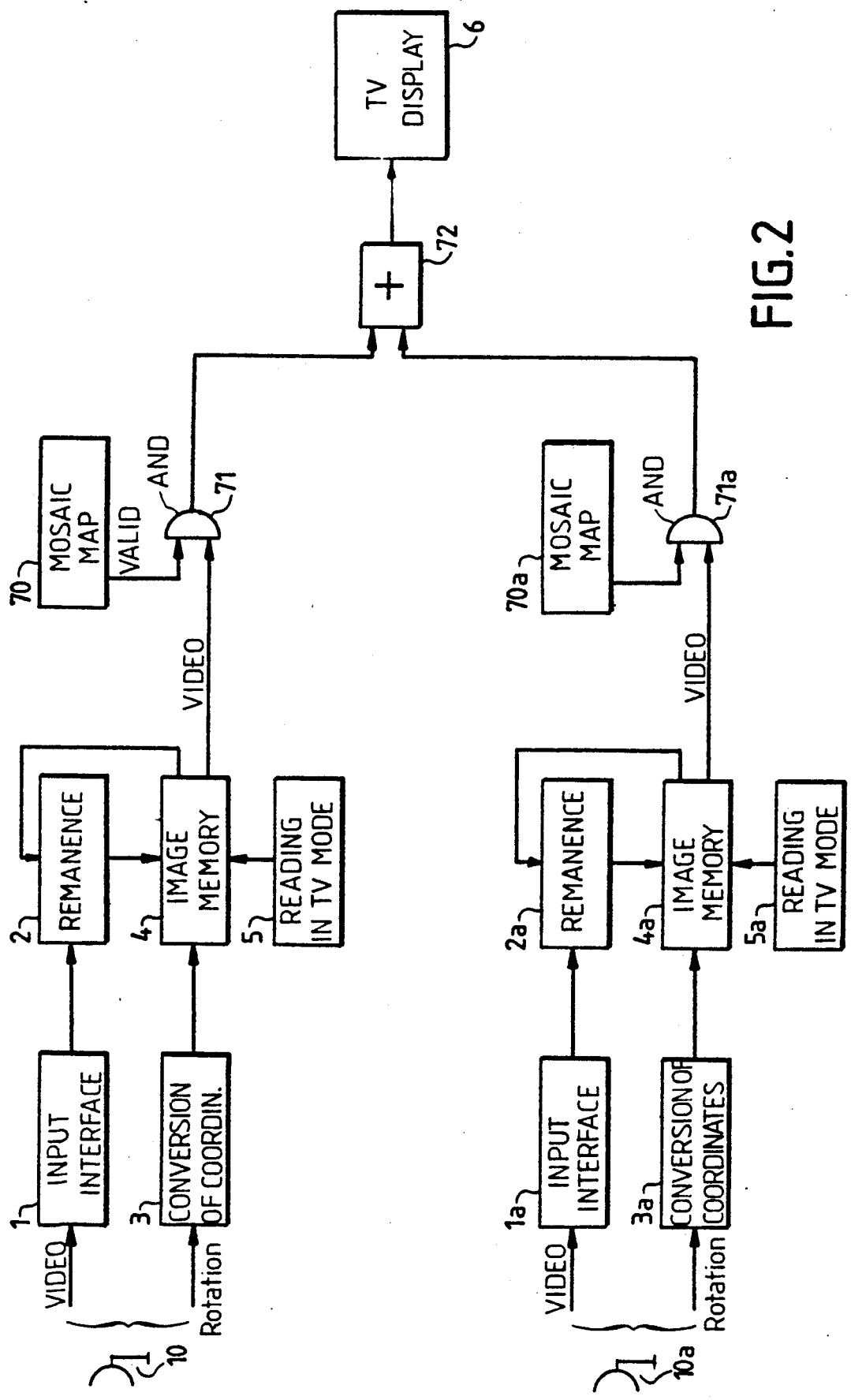
FIG. 2, a first embodiment of the mosaic according to the invention.

FIG. 2 represents a first embodiment of the producing mosaic images according to the invention, in the case of two radars for example.

This figure therefore schematically represents two radars giving video and rotation signals to two IDCs respectively. Each of the IDCs is formed by the above-described sets 1 to 5. The sets of the radar 10 IDCs bear an index a to distinguish them from those of the radar 10 IDCs.

The output video signal of each of the image memories (4, 4a) is transmitted to the display device 6 only after going through an AND type validation logic circuit (71, 71a) and a summator device 72, connecting the outputs of the circuits 71 and 71a.

Each of the IDCs further has a memory called a mosaic map (70, 70a).

This mosaic map contains, for each pixel, one validation bit which, through the AND circuit (71, 71a), authorizes or does not authorize the transmission of the content of the image memory (4, 4a) to the display device 6. In the case of two radars, as shown in FIG. 2, the mosaic map of the radar 10a is of course complementary to the mosaic map of the radar 10.

The memories containing the mosaic maps may be read-only memories, programmable if necessary, or RAMs, the content of which is loaded by the processor of the IDC through action by the operator.

Figure 3:
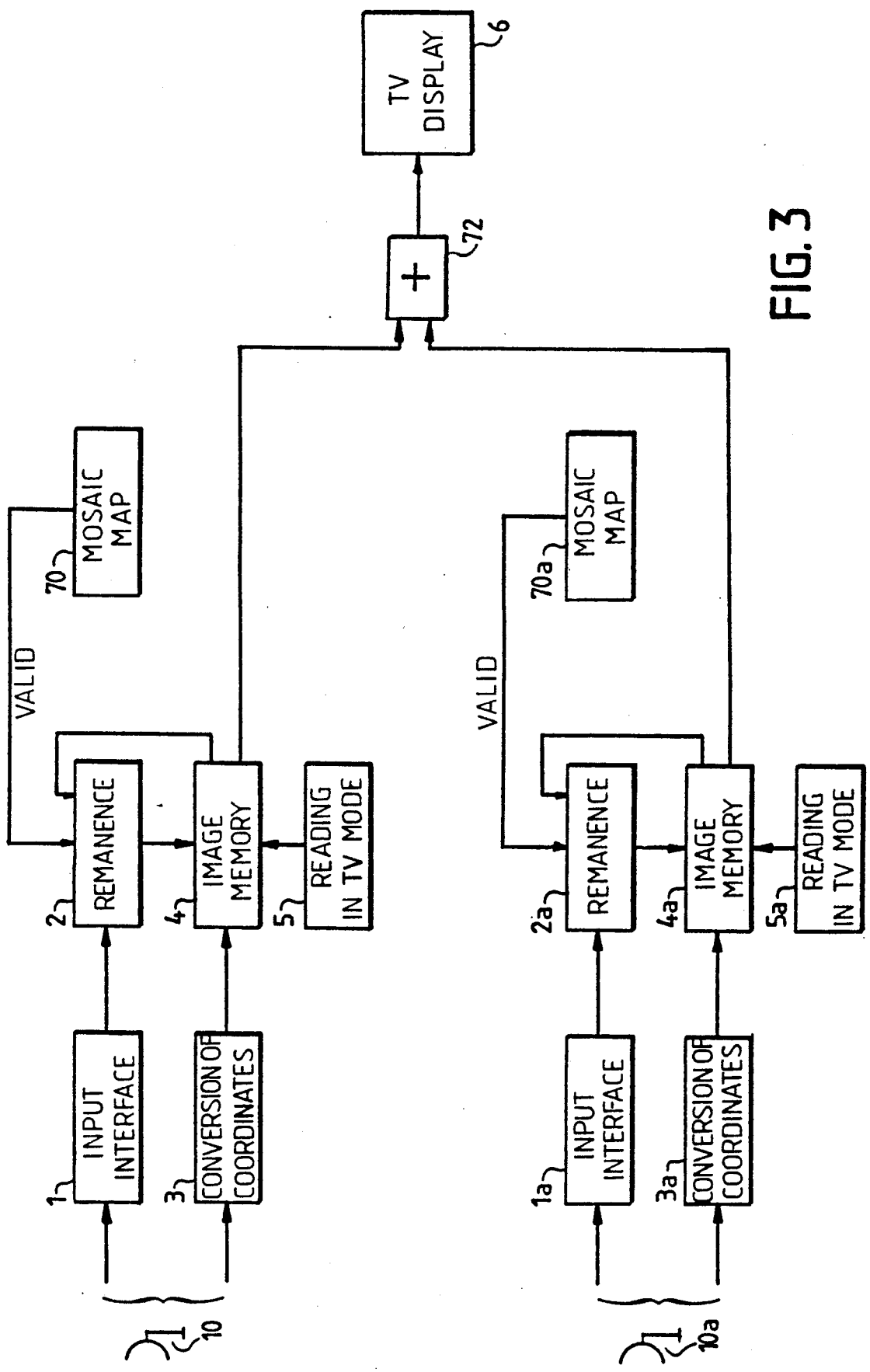
FIG. 3, a second embodiment of the mosaic according to the invention.

FIG. 3 shows a second embodiment of the radar for producing mosaic images according to the invention, wherein the mosaic maps come into play no longer at the output of the image memories but at the level of the remanence sets.

This figure again shows, by way of example, the two radars 10 and 10a, the receivers and the antennas of which give the video and rotation signals to the IDCs formed by the sets 1 to 5 (1a to 5a for the radar 10a).

In this embodiment, again, with each IDC there is associated a mosaic map, how referenced 77 and 77a respectively, but this map gives its validation information to the remanence set 2 (and 2a respectively). This set further receives, as earlier, the incident video signal given by the interface 1 and the previously recorded video signal given by the image memory 4.

The working of the remanence circuits is standard, except with respect to the validation by the information contained in the mosaic map (77, 77a).

It is recalled that the remanence set usually consists of a RAM, which receives the incident video signal on i bits, the memorized video signal in the image memory is provided on j bits, and gives at an output, towards the image memory, a video signal on j bits representing a predefined function of the two video signals received. Such an operation is described, for example, in the French patent application No. 82.17984 filed on behalf of THOMSON-CSF.

In the case of FIG. 3, the remanence memory (2, 2a) takes an additional input coming from the mosaic map (77, 77a) on one bit (the validation bit), the output of this memory, always designed for the image memory (4, 4a) being then a function of the two input video signals as well as of the mosaic validation bit. In other words, using this embodiment is tantamount to considering the mosaic as a particular relationship of remanence.

This embodiment has the advantage, as compared with the previous embodiment, of avoiding the validation logic (71, 71a).

The size of the memory forming the mosaic map may be one bit per pixel It may be smaller, in considering the pixels in the image memory by blocks, for each of which the mosaic bit is the same; in the case of blocks of 4×4 pixels, for example, the size of the mosaic map is thus reduced by a factor of 16.

Figure 4:
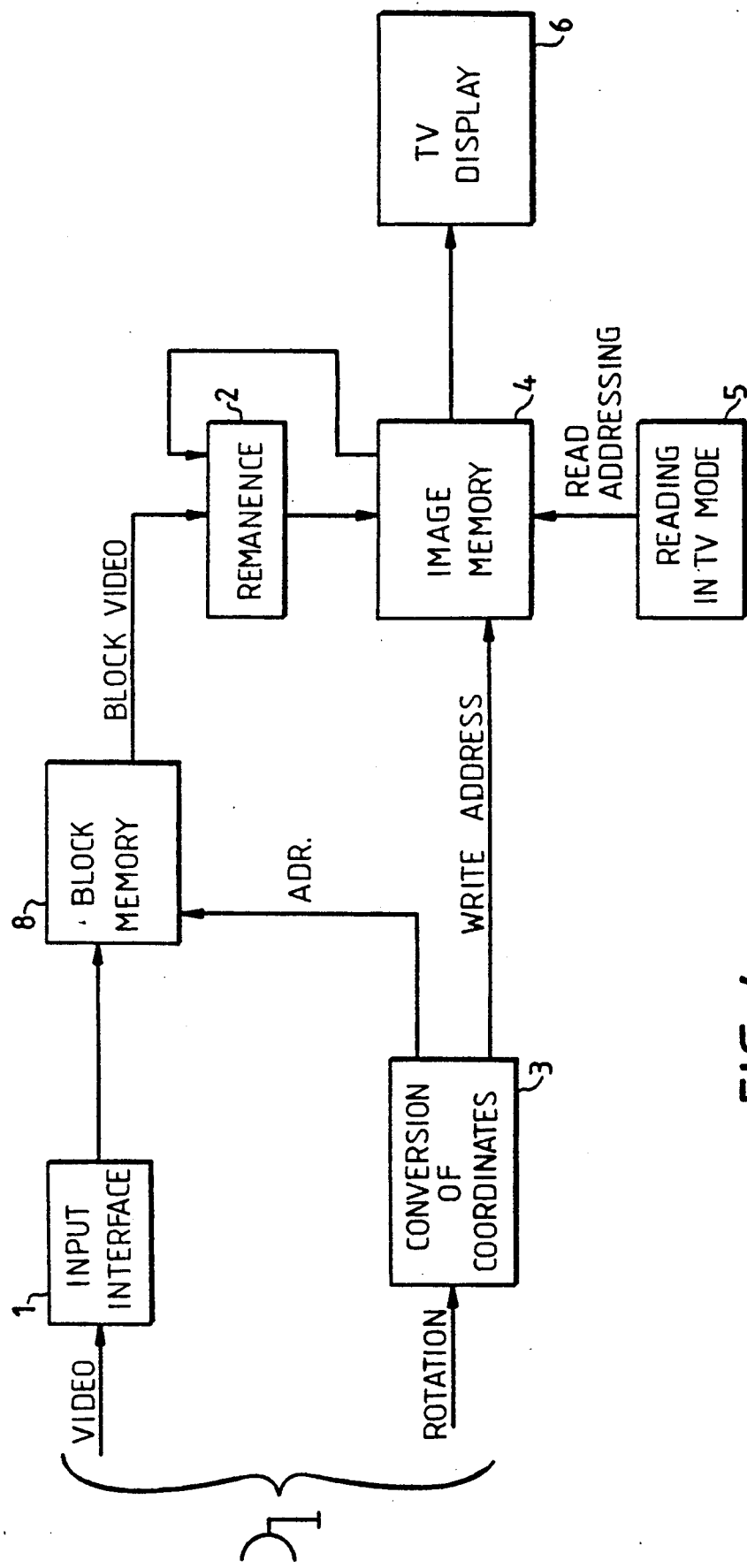
FIG. 4, the block diagram of a digital converter of images comprising an ancillary memory called a block memory.

FIG. 4 is the block diagram of an IDC comprising an intermediate memory called a block memory.

This figure again shows the same elements as in FIG. 1, except as regards a memory 8, called a block memory, placed between the incident video signal and the image memory or, more precisely, between the interface 1 and the remanence set 2.

The organization of this intermediate memory is of the same type as that of the image memory 4, but the adjacent pixels are furthermore assembled in boxes blocks, and these blocks are transferred in parallel into the image memory when they are totally filled up, which makes it possible to reduce the writing load of the latter. A structure such as this is described, for example, in the document No. EP. 68.852.

The structure of the block memory may be identical to that of the image memory. In one variant embodiment, the structure of the block memory and its mode of being filled may be optimized in order to reduce the size of the block memory as described, for example, in the French patent No. 86.01377.

The diagram of FIG. 1 is then modified in that the coordinates conversion set also provides the addressing of the block memory in writing and reading modes.

Figure 5:
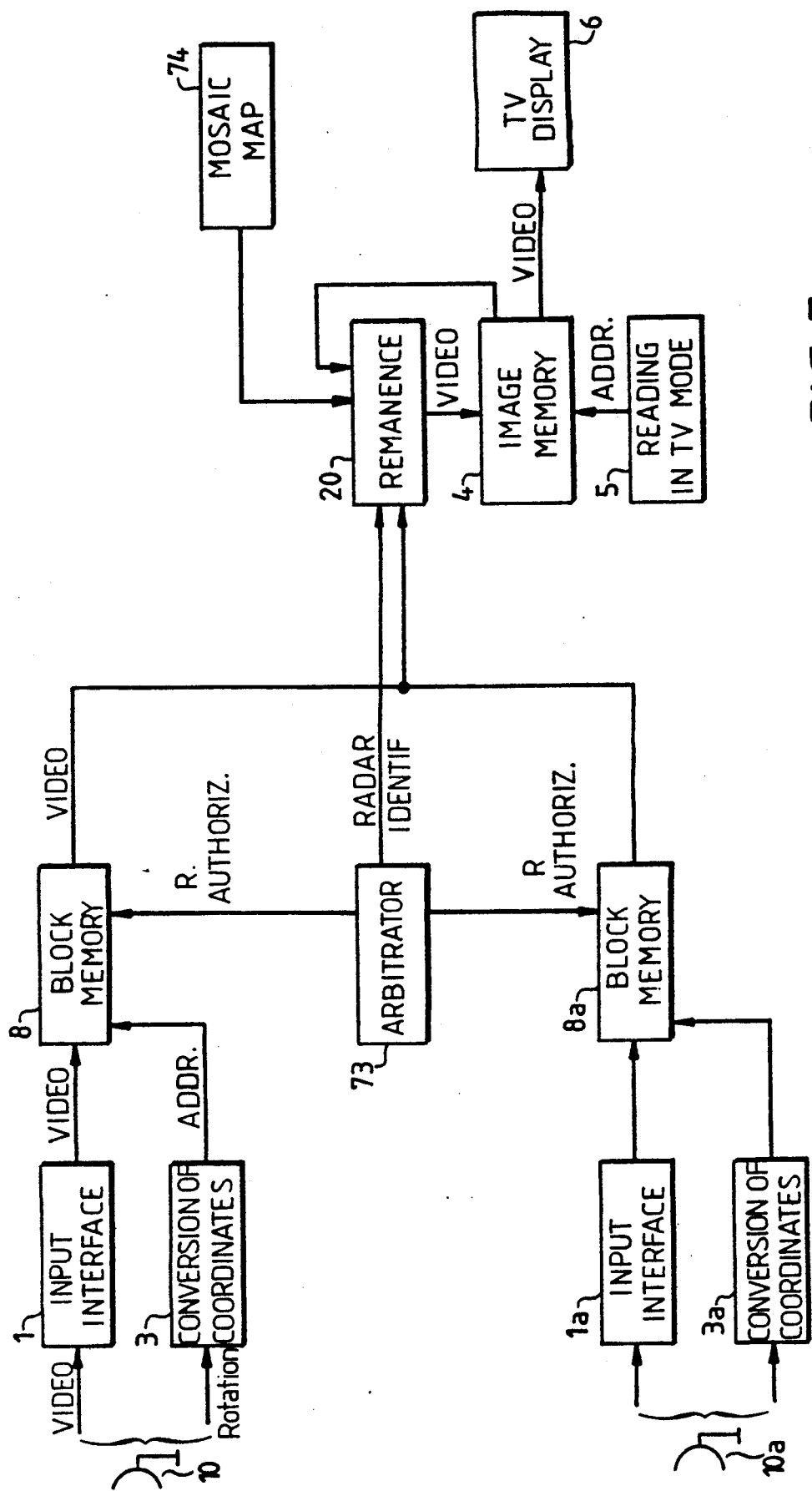
FIG. 5, a third embodiment of the mosaic according to the invention.

FIG. 5 represents a third embodiment of the mosaic according to the invention in the case of IDCs provided with a block memory.

This figure therefore again shows the radars 10 and 10a, each connected to the sets 1, 3, 8 and 1a, 3a, 8a respectively, described in FIG. 4, the sets 4, 5 and 6 being common to both radars, as well as the remanence set referenced herein as 20.

The device of FIG. 5 further comprises an arbitrator circuit 73 which has the function of authorizing the reading of either of the block memories 8 and 8a, given that the outputs of these two memories are connected to one and the same input of the remanence set 20. This circuit 73, alternately and in a predefined manner, authorizes the reading of one memory and then of the other, and it accompanies this authorization of reading by an identification of the radar which is thus authorized to provide its pieces of information to the set 20. This identification may consist, for example, of a number.

The system of FIG. 5 also has a memory 74, containing a single mosaic map, also provided to the remanence set 20.

Figure 6:
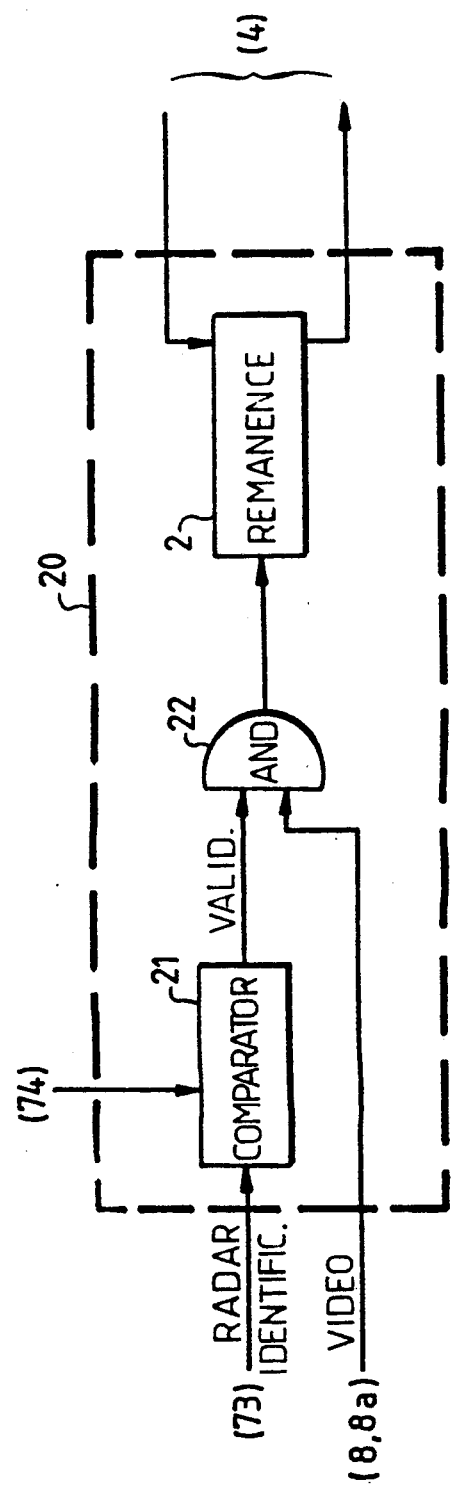
FIG. 6, the detail of one of the elements of the previous figure.

An embodiment of the set 20 is described in greater detail in FIG. 6.

The set 20 is formed by the preceding remanence memory 2, preceded by a validation logic circuit which comprises a comparator 21 and an AND circuit 22. The mosaic map contains herein, for each pixel, the identification of the radar to be taken into account. This identification is provided to the comparator which further receives, from the arbitrator circuit 73, the identification of the radar no giving the video signal. The comparator 21 delivers a validation signal if the identification of the radar corresponds to the one authorized by the mosaic map. The validation signal is given to the AND circuit 22 which furthermore receives the video signal and transmits it in the event of validation to the remanence memory 2.

Another embodiment of the set 20 consists in proceeding in a way similar to that described above with reference to FIG. 3, that is, in accepting, at the input of the remanence memory, the information (identification of the authorized radar) contained in the mosaic map for each pixel. The content of the memory 2 then takes this parameter into account, and the information at the output of this memory is a function, at one and the same time, of the two input video signals, the identification of the radar giving the video signal and the identification of the authorized signal.

This embodiment enables the use of IDCs comprising a block memory, with the advantages inherent in it. Furthermore, should the block memory have a size smaller than that of the image memory, this embodiment has the advantage, as compared with that of FIG. 3, of duplicating only the block memories and not the image memory.

Figure 7:
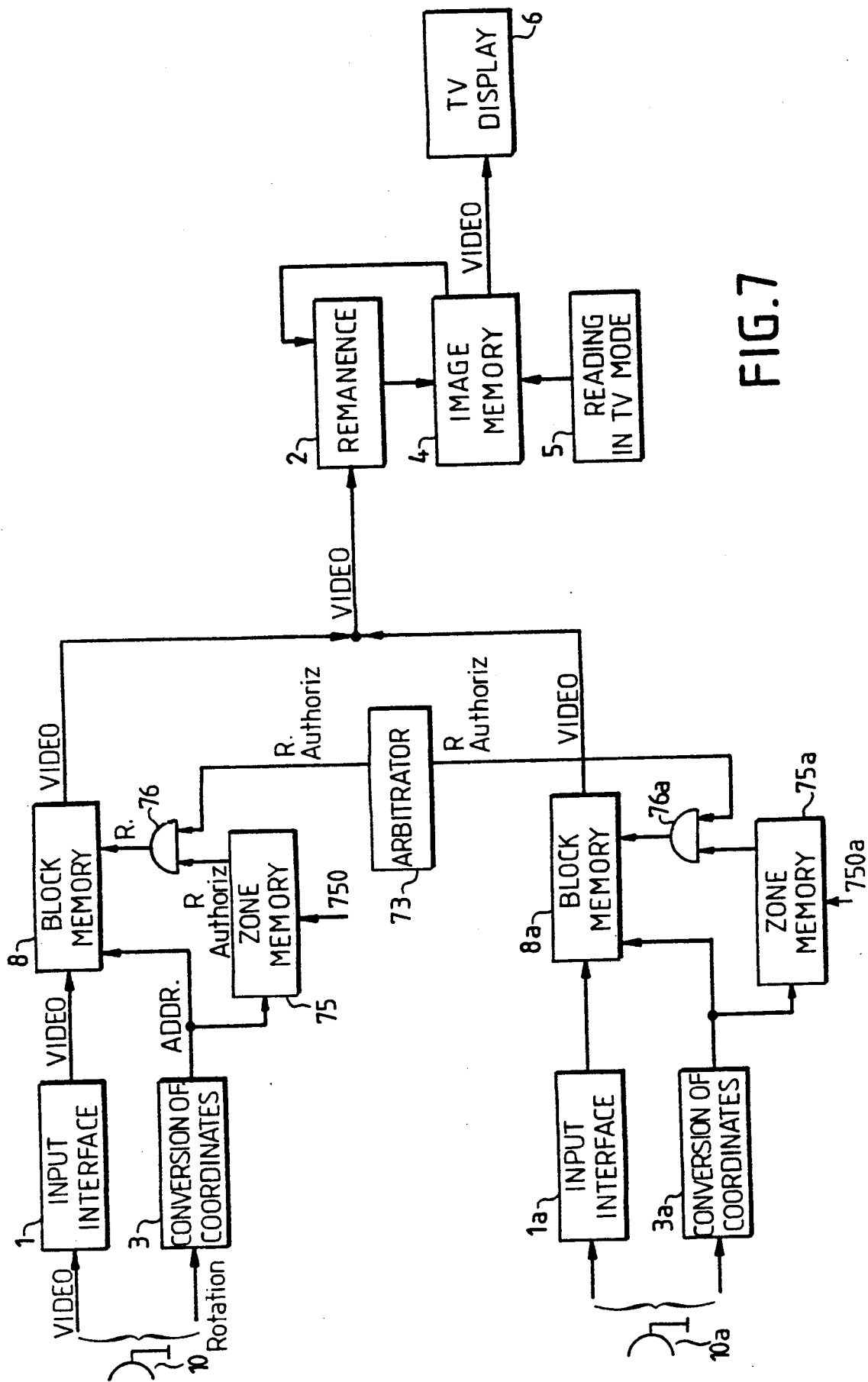
FIG. 7, a fourth embodiment according to the invention.

FIG. 7 represents a fourth embodiment of the mosaic according to the invention, also in the case of IDCs provided with block memories.

In this embodiment, the system further has, for each of the radars, a memory known as a zone memory, referenced 75 and 75a respectively. In one IDC, a memory such as this is used when it is sought to form "inserts" on the screen. It is recalled that the term "insert" is defined as a part of the radar cover zone belonging or not belonging to the image displayed on the screen, which is enlarged with respect to this image. This possibility is, for example, used when the operator seeks to examine a particular detail.

The zone memory (75, 75a), in this case receives the coordinates of the reading block, provided by the conversion set (3, 3a), and it contains the indication that this block belongs or does not belong to the image to be displayed. Its content is, for example, controlled (through the radar processor) by the operator (arrow 750). It accordingly gives the block memory an authorization or non-authorization for reading.

In the system of FIG. 7, the content of the zone memory is modified so as to further comprise the indications previously contained in the mosaic maps; the reading authorization then depends not only on the operator's wish to have an "insert" but also on the mosaic map.

As in the previous embodiment, the system has an arbitrator circuit 73 which authorizes the alternate reading of the memory blocks 8 and 8a: consequently, the authorization for reading, coming from the zone memories (75, 75a) is transmitted to the blocks memory through an AND gate (76, 76a).

The advantage of this embodiment is that all that is sent to the remanence set 2 are the useful parts of the images of the two radars, i.e. the parts effectively used for the formation of the displayed mosaic. As a result, the access bus to the set 2 is half as utilized as in the case of FIG. 5, where the totality of the video signal of the two radars is transmitted to the remanence set.

The above-described invention has been described, of course, by way of a non-restrictive example and it is thus, for example, that the different embodiments described for a mosaic with two radars can be extended to a mosaic with N radars.

We claim:

1. Method for the display of several radar images as a single resultant image, as a mosaic image of said radar images, each of the radar images being provided by a different radar in the form of analog video signals and polar coordinates of a respective radar, comprising:
   digitizing the video signal images of the radars:
   converting the polar coordinates associated with the video signals into Cartesian coordinates;
   memorizing the digitized video signal images and Cartesian coordinates; and,
   mutually excluding parts of said radar images comprising for each of the memorized images, transmitting a validated image, the pixels of which are validated by logic means for validating each pixel of each of the memorized images in response to validation data provided by a memory containing a mosaic map, said data identifying said pixel as belonging to the mosaic image to be displayed, and displaying the validated image pixels in a television mode display.

2. Method according to claim 1 further comprising for each of the images, a remanence step for varying the pixel values of the memorized image data over time, and summing the validated images for display.

3. Method according to claim 1 further comprising:
   alternating transmission of the different memorized images;
   memorizing for a second time the images transmitted;
   providing remanence to the image that has been memorized the second time, whereby said image is artificially aged, and during which the mutual exclusion is carried out; and,
   displaying in said television mode the image memorized for a second time.

4. Method according to claim 1, further comprising for each of the images, following the step of mutual exclusion, the following steps:
   alternating transmission of the different images memorized and validated;
   memorizing for a second time the images transmitted; and,
   displaying in television mode the image memorized for a second time.

5. Apparatus for producing a mosaic image from two or more radars observing the same geographical sector comprising:
   means for digitizing each of the video signals provided by each radar to provide image pixels;
   means for converting coordinate data from each radar to Cartesian coordinates;
   a first memory means for memorizing the digitized image pixels and Cartesian coordinates of said two radars, connected to the means for digitization, and means for conversion of coordinates;
   a second memory means containing a mosaic map of validation information, for identifying each pixel of the two or more images to be displayed;
   logic means for validating the pixels of each image connected to the second mosaic map memory; and,
   means to display the validated image pixels.

6. Apparatus according to claim 5 wherein said logic means of validation is connected to first and second memories comprising said first memory means containing each of the radar images, the device further comprising means for summing the validated image pixels.

7. Apparatus according to claim 5 comprising means for providing for remanence of the memorized image, connected to the first memory and connected to the second memory, and means for summing the validated image pixels.

8. Apparatus according to claim 5, further comprising:
arbitrator means connected to the first memory means and providing for an alternating transmission of the memorized images in the first memory means;
a third memory providing for memorizing the image transmitted by the first memory means; and,
means providing for the remanence of the image of the third memory.

9. Apparatus according to claim 5 further comprising:
arbitrator means connected to the first memory means and providing for an alternating transmission of the images memorized in the first memory means;
a third memory providing for a second memorization of the image transmitted by the first memory means, and connected to said means to display for displaying said memorized image; and,
means providing for the remanence of the image memorized in the third image memory.

* * * * *